United States Patent Office 2,856,424
Patented Oct. 14, 1958

2,856,424
OXIDATION OF ORGANIC COMPOUNDS

William G. Toland, Jr., San Rafael, Calif., assignor to California Research Corporation, San Francisco, Calif., a corporation of Delaware No Drawing. Application July 1, 1957
Serial No. 668,851

4 Claims. (Cl. 260—524)

This invention relates to a process for oxidizing organic compounds. More particularly, it relates to a process for oxidizing hydrocarbons, and especially to a process for oxidizing methyl-substituted aromatic hydrocarbons.

Pursuant to the invention, organic compounds are oxidized by heating them with an oxidizing agent consisting essentially of ammonium thiosulfate and water to a temperature in the range from 500 to 700° F. under a superatmospheric pressure sufficient to maintain the water in liquid phase.

Ammonium thiosulfate will oxidize organic compounds under the conditions above indicated according to the following equations:

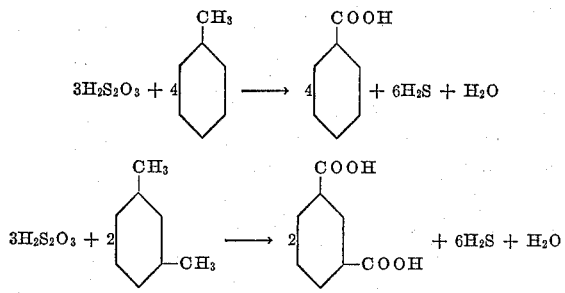

From the above equations, it will be seen that 0.75 mole of thiosulfate ion is required to oxidize 1 methyl group bonded to an aromatic nucleus to a carboxyl group. For convenience, the equations have been written showing thiosulfuric acid as the oxidizing agent. It may be seen from the equations that water is produced as a product and is not a reactant. It is found, however, that the reaction does not proceed satisfactorily unless a relatively large proportion of water is present in the reaction mixture, desirably from about 20 to 60 moles of water per mole of organic material subjected to oxidation.

As indicated above, the reaction is conducted at temperatures in the range from 500 to 700° F., preferably the reactions are carried out at temperatures ranging from 550 to 650° F. in which range rapid reaction is obtained without appreciable loss of the feed material to undesired side reaction products.

The reaction is carried out under a superatmospheric pressure sufficient to maintain a part of the water in liquid phase. Pressures ordinarily employed are in the range from about 1000 to 5000 p. s. i. g. The reaction may be carried out batchwise in a bomb-type reactor, in which case the quantity of reactants, in particular the quantity of water, is so proportioned to the size of the reactor that the autogenous pressure within the reactor will lie within the desired pressure range and serve to maintain a part of the water in liquid phase. The reaction may also be carried out continuously by passing the reactants through a tubular reaction zone, in which case the reaction zone is valved to maintain a pressure in the range from 2000 to 4000 p. s. i. g.

The process of the invention is illustrated by the following examples:

Example 1

The following were charged to a 2.5 liter autoclave: 75 g. of meta-xylene (0.707 m.) in a test tube, and 262 g. 60% $(NH_4)_2S_2O_3$ solution (1.06 m. $(NH_4)_2S_2O_3$) in 658 g. $H_2O$ (42.4 m. total $H_2O$). They were heated to 600° F. before shaking to mix in the xylene, and held for 90 minutes. Pressure rose to 1950 p. s. i. g. Gases were bled from the bomb cold. There was recovered 20 g. $H_2S$. Liquid products were steam stripped to pH 6, and filtered to remove a small cake of sulfur. The filtrate was then saponified with 60 g. NaOH, acidified to pH 6, charcoal treated, and filtered. The filtrate of sodium isophthalate was acidified with HCl to pH 2, the precipitated phthalic acids filtered, washed and dried. There was obtained a 90.5 mole percent (140 weight percent) yield of isophthalic acid, NE=84.0.

Example 2

96% meta-xylene, ammonium thiosulfate and water were charged to a bomb reactor. The mole ratio of xylene to thiosulfate to water was 1:6:60. The bomb was sealed and heated to 600° F. for a period of two hours during which time the pressure attained a maximum value of 2600 p. s. i. g. The acid product recovered had a saponification equivalent of 81.8. The yield of isophthalic acid was 89.9 mole percent of the xylene charged.

Example 3

This example was conducted similarly to Example 1, charging sodium thiosulfate, meta-xylene and water to the reaction zone. The mole ratio of meta-xylene to sodium thiosulfate to water was 1:1.5:60. The mixture was heated to 600° F. for a period of 60 minutes during which time the pressure attained a maximum value of 1850 p. s. i. g. An acid product was recovered which had a neutral equivalent of 105 and which amounted to 27% by weight of the meta-xylene charged.

The foregoing example is presented to illustrate the fact that, although the metal thiosulfates, and particularly sodium thiosulfate, may be employed as the oxidizing agent in the oxidation of methyl-substituted aromatic hydrocarbons, nevertheless they are not the functional equivalent of ammonium thiosulfate as exemplified by the material difference in yields of phthalic acid resulting from the oxidation reaction under comparable conditions of reaction.

This application is a continuation-in-part of my application Serial No. 374,425, filed August 14, 1953, entitled "Oxidation of Organic Compounds," now abandoned.

Obviously, many modifications and variations of the invention as hereinbefore set forth may be made without departing from the spirit and scope thereof, and therefore only such limitations should be imposed as are indicated in the appended claims.

I claim:
1. A process for oxidizing a methyl-substituted benzene hydrocarbon having at least one nuclear hydrogen replaced by a methyl group which comprises heating said substituted benzene hydrocarbon with an oxidizing solution comprising water and ammonium thiosulfate to a temperature in the range from 500 to 700° F. under a superatmospheric pressure sufficient to maintain a part of the water in liquid phase.
2. A method as defined in claim 1 wherein said substituted benzene hydrocarbon is a xylene.
3. A process for oxidizing a methyl-substituted benzene hydrocarbon having at least one nuclear hydrogen replaced by a methyl group which comprises heating said substituted benzene hydrocarbon with a substantial mo- lecular excess of water and about 0.75 mole of ammonium thiosulfate per mole of methyl group contained in said substituted benzene hydrocarbon to a temperature in the range from 550 to 650° F. under a superatmospheric pressure sufficient to maintain a part of the water in liquid phase.

4. A method as defined in claim 3 wherein said substituted benzene hydrocarbon is a xylene.

References Cited in the file of this patent

UNITED STATES PATENTS

| | | |
|---|---|---|
| 2,587,666 | Toland | Mar. 4, 1952 |
| 2,610,980 | Naylor | Sept. 16, 1952 |